US012627239B2

(12) United States Patent
Tsai et al.

(10) Patent No.: US 12,627,239 B2
(45) Date of Patent: May 12, 2026

(54) SYNCHRONOUS RECTIFICATION CONTROL METHOD FOR RESONANT POWER SUPPLY BY OPTIMIZING MAXIMUM CONDITION WIDTH FOR TURN-OFF TIME

(71) Applicant: DELTA ELECTRONICS, INC., Taoyuan City (TW)

(72) Inventors: Lin-Ya Tsai, Taoyuan City (TW); Chien-An Lai, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 407 days.

(21) Appl. No.: 18/341,139

(22) Filed: Jun. 26, 2023

(65) Prior Publication Data

US 2024/0322701 A1    Sep. 26, 2024

(30) Foreign Application Priority Data

Mar. 24, 2023    (CN) .......................... 202310297636.6

(51) Int. Cl.
*H02M 3/335* (2006.01)
*H02M 3/00* (2006.01)
(52) U.S. Cl.
CPC .......... *H02M 3/33592* (2013.01); *H02M 3/01* (2021.05)
(58) Field of Classification Search
CPC ................................................ H02M 3/33592
See application file for complete search history.

(56) References Cited

U.S. PATENT DOCUMENTS

| | | | |
|---|---|---|---|
| 5,672,952 A * | 9/1997 | Szepesi ................. | H02J 7/0031 |
| | | | 320/DIG. 19 |
| 2009/0213628 A1 | 8/2009 | Yang et al. | |
| 2018/0198375 A1* | 7/2018 | Xu .................... | H02M 3/33507 |

FOREIGN PATENT DOCUMENTS

TW       200937825 A      9/2009

OTHER PUBLICATIONS

W. Feng, F. C. Lee, p. Mattavelli and D. Huang, "A Universal Adaptive Driving Scheme for Synchronous Rectification in LLC Resonant Converters," in IEEE Transactions on Power Electronics, vol. 27, No. 8, pp. 3775-3781, Aug. 2012 (Year: 2012).*
Office Action date Apr. 16, 2024 of the corresponding Taiwan patent application No. 112111068.

* cited by examiner

*Primary Examiner* — Peter M Novak
(74) *Attorney, Agent, or Firm* — MUNCY, GEISSLER, OLDS & LOWE, P.C.

(57)    ABSTRACT

A synchronous rectification control method for a resonant power supply includes steps as follows. First, setting an initial conduction width of a synchronous rectification switch, which is less than a maximum conduction width. Afterward, detecting a voltage waveform across two ends of a body diode of the synchronous rectification switch. Afterward, calculating a resonant frequency according to the voltage waveform. Finally, determining the maximum conduction width of the synchronous rectification switch.

9 Claims, 4 Drawing Sheets

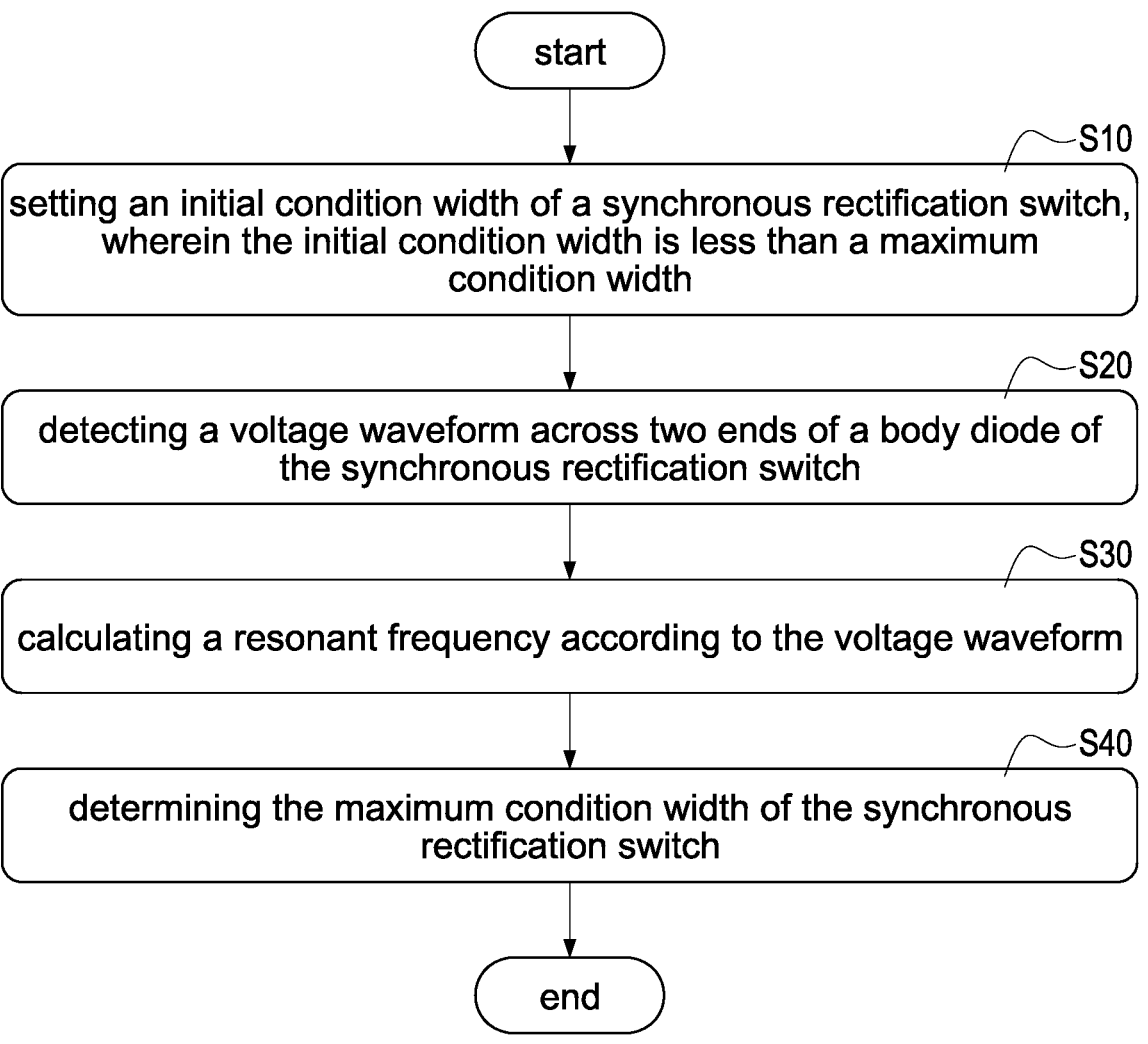

start

S10 setting an initial condition width of a synchronous rectification switch, wherein the initial condition width is less than a maximum condition width

S20 detecting a voltage waveform across two ends of a body diode of the synchronous rectification switch

S30 calculating a resonant frequency according to the voltage waveform

S40 determining the maximum condition width of the synchronous rectification switch end

FIG.4

SYNCHRONOUS RECTIFICATION CONTROL METHOD FOR RESONANT POWER SUPPLY BY OPTIMIZING MAXIMUM CONDITION WIDTH FOR TURN-OFF TIME

CROSS REFERENCE TO RELATED APPLICATIONS

This application claims priority of application Ser. No. 20/231,0297636.6 filed in China on Mar. 24, 2023 under 35 U.S.C. § 119, the entire contents of all of which are hereby incorporated by reference.

BACKGROUND

Technical Field

The present disclosure relates to a control method for a resonant power supply, and more particularly to a synchronous rectification control method for a resonant power supply.

Description of Related Art

The statements in this section merely provide background information related to the present disclosure and do not necessarily constitute prior art.

The LLC resonant converter, which has lower switching losses, has now become a widely adopted power topology. The LLC resonant converter has the advantage of higher efficiency and switching frequency compared to the hard-switching topology, as it can achieve zero-voltage turned-on of the power diode at the primary side and zero-current turned-off of the rectification switch at the secondary side within a wide load range.

For the LLC resonant converter, the turned-on point of the synchronous rectification switch is basically the same as that of the power diode on the primary side, but the timing of turning off the synchronous rectification switch will affect the overall system's operation efficiency and characteristics. When the synchronous rectification switch is turned off earlier than the optimal turned-off point, the current will flow through the body diode of the synchronous rectification switch, thereby increasing its losses. When the synchronous rectification switch is turned off later than the optimal turned-off point, the secondary-side current will affect the operation state of the primary-side resonant tank of the LLC resonant converter, thereby causing distortion of the resonant current. In the existing technologies, there is a lack of synchronous rectification control method for resonant power supplies that can effectively solve the above-mentioned problems.

Accordingly, the present disclosure provides a synchronous rectification control method to solve the existing problems: when the time of controlling the conduction of synchronous rectification switch is greater than the maximum conduction width, it will cause distortion of the resonant current, resulting in a risk of unsafe operation. When the time of controlling the conduction of synchronous rectification switch is too small compared to the maximum conduction width, it will increase the losses of the synchronous rectification switch and be detrimental to the design of converter efficiency.

SUMMARY

An objective of the present disclosure is to provide a synchronous rectification control method for a resonant power supply to solve the problems of existing technology.

In order to achieve the above-mentioned objective, the synchronous rectification control method includes steps of: setting an initial condition width of a synchronous rectification switch, wherein the initial condition width is less than a maximum condition width, detecting a voltage waveform across two ends of a body diode of the synchronous rectification switch, calculating a resonant frequency according to the voltage waveform, and determining the maximum condition width of the synchronous rectification switch.

In one embodiment, turning on the synchronous rectification switch at a first time, turning off the synchronous rectification switch at a second time, and turning on the synchronous rectification switch at a third time; calculating a first time difference between the second time and the first time, and calculating a second time difference between the third time and the second time; selecting the smaller of the first time difference and the second time difference as the maximum condition width.

In one embodiment, generating a first pulse voltage at the first time, generating a second pulse voltage at the second time, and generating a third pulse voltage at the third time; calculating the first time difference according to the first pulse voltage and the second pulse voltage, and calculating the second time difference according to the second pulse voltage and the third pulse voltage.

In one embodiment, the first time difference is less than the second time difference.

In one embodiment, the synchronous rectification switch is disposed on a primary side of the resonant power supply, and the voltage waveform across two ends of the body diode is a voltage waveform between a drain and a source of the synchronous rectification switch.

In one embodiment, the resonant power supply includes a dual comparator, and the dual comparator receives a voltage at the drain and a voltage at the source.

In one embodiment, acquiring a plurality of time differences, acquiring an average value of the plurality of time differences, and calculating the resonant frequency.

In one embodiment, delaying to turn off the synchronous rectification switch when the synchronous rectification switch operates at a zero-current condition.

In one embodiment, periodically updating the maximum condition width.

In one embodiment, operating the resonant power supply at a half-loading condition to make an input DC voltage of the resonant power supply decrease and the resonant power supply operate below a first resonant frequency point.

Accordingly, the synchronous rectification control method achieves the following features and advantages: 1. Due to the drain-source voltage detection of the synchronous rectification switch by the dual-ended detection circuit, the effects caused at high and low temperatures can be ignored by offsetting the temperature drift at two ends of the body diode. 2. According to the resonant frequency calculated based on the voltage waveform across two ends of the synchronous rectification switch, it can be used to adjust the optimal operation point of the converter. 3. By introducing dual-ended voltage detection with synchronous rectification switch and adjusting the resonant frequency accordingly, the DC voltage can be decreased to the operation point of the optimal resonant frequency. 4. Design the maximum conduction width for the ideal synchronous rectification switch to ensure the safe operation of the resonant converter and optimize efficiency.

It is to be understood that both the foregoing general description and the following detailed description are exemplary and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows:

FIG. 4 is a flowchart of a control method for the resonant power supply according to the present disclosure.

DETAILED DESCRIPTION

Figure 1:
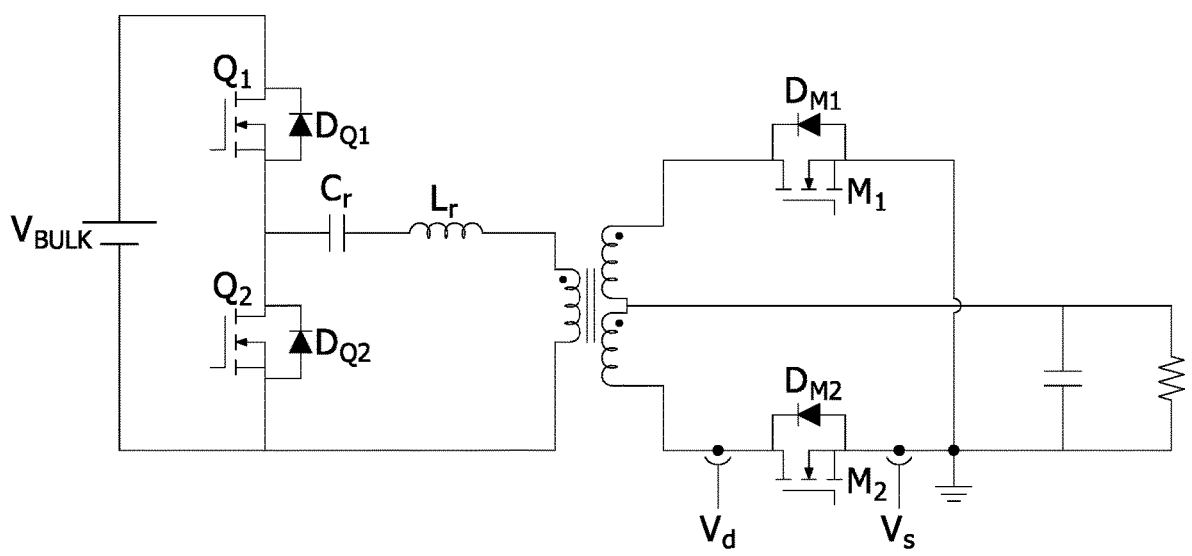
FIG. 1 is a circuit diagram of a resonant power supply according to the present disclosure.

Reference will now be made to the drawing figures to describe the present disclosure in detail. It will be understood that the drawing figures and exemplified embodiments of present disclosure are not limited to the details thereof.

As mentioned above, the timing of turning off the synchronous rectification switch will affect the overall system's operation efficiency and characteristics. Therefore, there will need to be a limitation on the maximum conduction width (or maximum conduction time, $T_{SR\_max}$) of the synchronous rectification switch. The reason is that: when the time of controlling the conduction of synchronous rectification switch is greater than the maximum conduction width, it will cause distortion of the resonant current, resulting in a risk of unsafe operation; when the time of controlling the conduction of synchronous rectification switch is too small compared to the maximum conduction width, it will increase the losses of the synchronous rectification switch and be detrimental to the design of converter efficiency.

The resonant point frequency (resonant frequency) of the resonant converter is determined by the resonant parameters of the designed resonant components. However, due to the presence of parameter errors in the resonant components, the resonant frequency of each resonant converter may vary. For safety reasons, in the design process, a higher frequency than the expected frequency is usually considered. Therefore, the corresponding maximum conduction width ($T_{SR\_max}$) will be smaller than the ideal design expectation.

Please refer to FIG. 1, which shows a circuit diagram of a resonant power supply according to the present disclosure. The resonant power supply includes a transformer having a primary-side winding and a secondary-side winding. A primary-side circuit of the resonant power supply includes a resonant tank, and the resonant tank is coupled to the primary-side winding. The resonant tank includes a resonant capacitor Cr, a resonant inductor Lr, and a magnetizing inductor of the transformer coupled in series.

The primary-side circuit of the resonant power supply further includes a high-side $Q_1$ switch and a low-side switch $Q_2$. A commonly-connected node of the high-side $Q_1$ switch and the low-side switch $Q_2$ is coupled to the series-connected resonant tank. The resonant power supply receives a DC voltage $V_{BULK}$ through the high-side $Q_1$ switch and the low-side switch $Q_2$, and the DC voltage $V_{BULK}$ supplies power to the resonant power supply, that is, the DC voltage $V_{BULK}$ is an input power of the resonant power supply.

A secondary-side circuit of the resonant power supply includes a synchronous rectification circuit. The synchronous rectification circuit includes a first synchronous rectification switch $M_1$ and a second synchronous rectification switch $M_2$. The first synchronous rectification switch $M_1$ has a first body diode $D_{M1}$ connected between a source and a drain of the first synchronous rectification switch $M_1$, and the second synchronous rectification switch $M_2$ has a second body diode $D_{M2}$ connected between a source and a drain of the second synchronous rectification switch $M_2$.

The synchronous rectification control method of the present has two main features: First, a voltage at both ends of the body diode of the synchronous rectification switch is detected by dual-ended manner, i.e., the cross-voltage between a source and a drain of the synchronous rectification switch, and the voltage comparison is performed. Second, through calculation using backend software (or firmware), the maximum conduction width ($T_{SR\_max}$) of each resonant power supply can be determined based on the parameter errors present in different resonant components in the date of manufacture.

Figure 2:
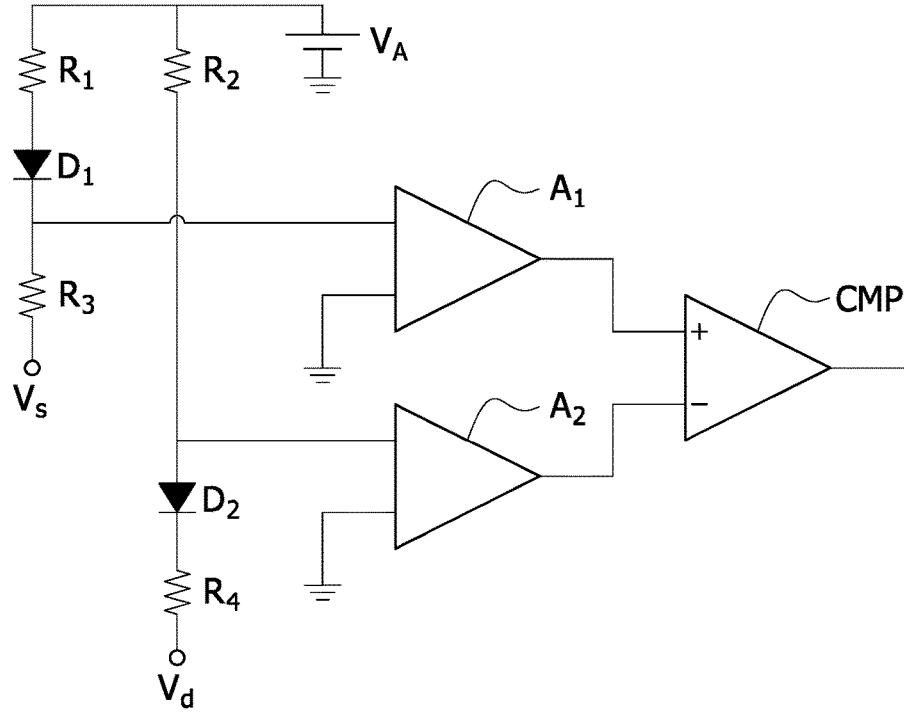
FIG. 2 is a circuit diagram of a dual-ended detection circuit for a synchronous rectification switch of the resonant power supply according to the present disclosure.

Please refer to FIG. 2, which shows a circuit diagram of a dual-ended detection circuit for a synchronous rectification switch of the resonant power supply according to the present disclosure. Referring to FIG. 1, the detection between the source and the drain of the second synchronous rectification switch $M_2$ is taken as an example for illustration. In practical applications, however, due to the symmetry of the circuit, it is also possible to use the detection between the source and the drain of the first synchronous rectification switch $M_1$. In particular, a voltage detected at the source of the second synchronous rectification switch $M_2$ is a source voltage Vs, and a voltage detected at the drain of the second synchronous rectification switch $M_2$ is a drain voltage Vd, and correspond respectively to an anode voltage and a cathode voltage of the second body diode $D_{M2}$.

For the convenience of illustrating the dual-ended detection circuit, the source voltage Vs is as the reference voltage for grounding, and it is assumed that a fixed voltage VA is 3.3 volts.

When $$\frac{(3.3 - Vd1)*R3}{R1 + R3} > \frac{(3.3 - SR\_Vd - Vd2)*R4}{R2 + R4},$$

the rising edge of a comparator CMP is triggered.

When $$\frac{(3.3 - Vd1)*R3}{R1 + R3} < \frac{(3.3 - SR\_Vd - Vd2)*R4}{R2 + R4},$$

the falling edge of the comparator CMP is triggered.

Where Vd1 is a forward voltage of the first diode $D_1$, Vd2 is a forward voltage of the second diode $D_2$, SR_Vd is the drain voltage of the synchronous rectification switch.

Furthermore, it is assumed that a conduction voltage of the SR_Vd is set to 0 volt, and therefore it is just to set R1/R3=R2/R4.

Therefore, $$\frac{(3.3 - Vd1) * R3}{R1 + R3} = \frac{(3.3 - SR\_Vd - Vd2) * R4}{R2 + R4} \text{ and}$$

$$\frac{(3.3 - Vd1) * R3}{R1 + R3} = \frac{(3.3 - 0 - Vd2) * R4}{R2 + R4}$$

Therefore, it can be deduced that (Vd1)=(Vd2). This proves that when Vd1 and Vd2 are in the same package, the voltage variation produced will basically not affect the detection point so that it can ensure that the positive and negative trigger points of the comparator are not easily affected by the temperature drift of the diode, and can also detect the ideal optimal conduction point of the SR (synchronous rectification switch).

Figure 3:
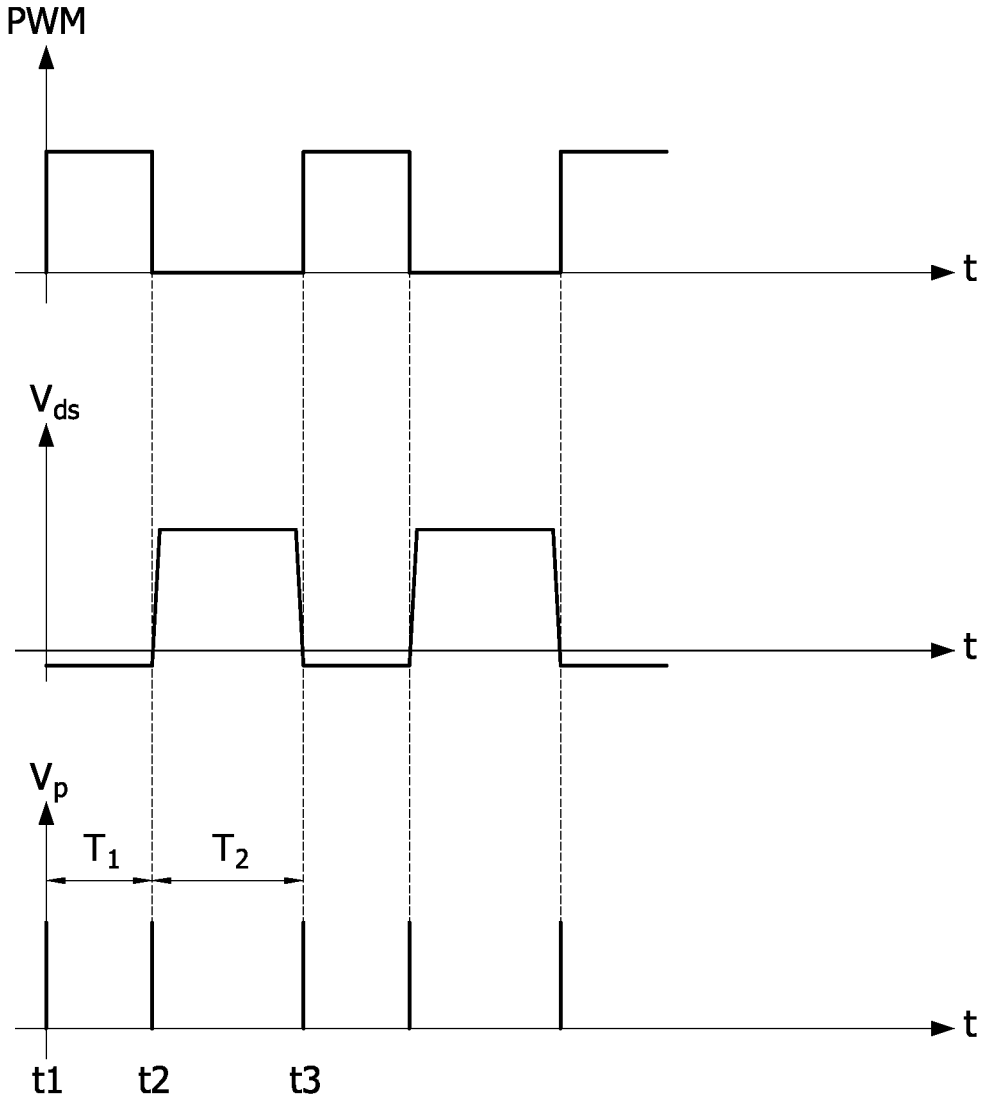
FIG. 3 is a schematic voltage waveform diagram of a dual-ended detection operation of the synchronous rectification switch in the resonant power supply of the present disclosure.

Please refer to FIG. 3, which shows a schematic voltage waveform diagram of a dual-ended detection operation of the synchronous rectification switch in the resonant power supply of the present disclosure. As disclosed in FIG. 3, PWM represents a driving control signal of the synchronous rectification switch, and Vds represents the cross voltage of the synchronous rectification switch (SR), which can be implemented through the dual comparator shown in FIG. 2. Vp represents a pulse voltage required for calculating the resonant frequency, which means that the corresponding resonant frequency may be calculated by using Vp as the time difference. Usually, the output of the resonant power supply is operated at a half-load state so that the DC voltage V$_{BULK}$ is decreased to operate below a first resonant frequency point.

At a first time t1, the synchronous rectification switch (SR) is turned on, and therefore a state in which current flows through the body diode of the synchronous rectification switch in a short period of time. In this condition, the Vds is-0.7 volts, and a pulse voltage is generated. Until a second time t2, the synchronous rectification switch is turned off, and therefore a time difference between the second time t2 and the first time t1, i.e., a first time difference T1, is a turned-on (conduction) period of time of the synchronous rectification switch. Under the turned-off synchronous rectification switch at the second time t2, since the Vds is increased, a second pulse voltage is generated at the second time t2. Similarly, the same is true if the primary-side resonant current commutates or if the primary-side resonant current stops delivering energy to the secondary side. Until a third time t3, the synchronous rectification switch is turned on again so that the Vds is decreased to −0.7 volts again, and a third pulse voltage is generated, and therefore a time difference between the third time t3 and the second time t2, i.e., a second time difference T2, is a turned-off period of time of the synchronous rectification switch. Accordingly, the calculation of resonant frequency is derived by using the pulse voltage Vp generated through turning on and turning off the synchronous rectification switch as a reference for time difference calculation.

In theory, the time difference between the second time t2 and the first time t1 (i.e., the first time difference T1) should be the same as the time difference between the third time t3 and the second time t2 (i.e., the second time difference T2), both being 50%. In practical applications, due to the design of the first time difference T1 which only includes the conduction (turned-on) time of the synchronous rectification switch, and the second time difference T2 which includes the turned-off time and two dead times of the synchronous rectification switch, the first time difference T1 is smaller than the second time difference T2, i.e., being not symmetrical. Therefore, in the present disclosure, the first resonant frequency point is determined by extracting the smaller first time difference T1.

Please refer to FIG. 4, which shows a flowchart of a control method for the resonant power supply according to the present disclosure. The method includes the following steps. First, setting an initial condition width of a synchronous rectification switch, wherein the initial condition width is less than a maximum condition width (S10). For example, the ideal maximum duty cycle is 50%, and therefore an initial duty cycle below 50% is set, such as but not limited to 30%, as the initial condition width.

Afterward, detecting a voltage waveform across two ends of a body diode of the synchronous rectification switch (S20). The two ends of the body diode may be the drain and source of the synchronous rectification switch, and a voltage of the drain and a voltage of the source are detected. Also, a dual comparator is used to acquire the voltage waveform across two ends of the body diode, i.e., the synchronous rectification switch.

Afterward, calculating a resonant frequency according to the voltage waveform (S30). Accordingly, according to the voltage waveform across two ends of the synchronous rectification switch, the calculation of resonant frequency is derived by using the pulse voltage Vp generated through turning on and turning off the synchronous rectification switch. Usually, the output of the resonant power supply is operated at a half-load state so that the DC voltage V$_{BULK}$ is decreased to operate below a first resonant frequency point. Specifically, at a first time t1, the synchronous rectification switch is turned on, and therefore a state in which current flows through the body diode of the synchronous rectification switch in a short period of time, and in this condition, a pulse voltage is generated. Until a second time t2, the synchronous rectification switch is turned off, and therefore a time difference between the second time t2 and the first time t1, i.e., a first time difference T1, is a turned-on (conduction) period of time of the synchronous rectification switch. Under the turned-off synchronous rectification switch at the second time t2, since the Vds is increased, a second pulse voltage is generated at the second time t2. Until a third time t3, the synchronous rectification switch is turned on again and a third pulse voltage is generated, and therefore a time difference between the third time t3 and the second time t2, i.e., a second time difference T2, is a turned-off period of time of the synchronous rectification switch. Accordingly, the calculation of resonant frequency is derived by using the pulse voltage Vp generated through turning on and turning off the synchronous rectification switch as a reference for time difference calculation.

Finally, determining the maximum condition width of the synchronous rectification switch (S40). By using the time difference acquired from dual-ended voltage detection in the previous steps, a smaller first time difference T1 and a larger second time difference T2 can be acquired. Therefore, in the present disclosure, the maximum condition width of the synchronous rectification switch is determined by extracting the smaller first time difference T1.

Incidentally, due to the presence of 120-Hz harmonic components in the DC voltage V$_{BULK}$, in order to avoid misjudgment caused by calculating the time difference only based on a single voltage value, the time difference based on the average DC voltage V$_{BULK}$ will be used for calculation.

In other words, by acquiring time difference during the 16.67-millisecond period (i.e., a reciprocal of the 60-Hz) and calculating the average of all time differences, the first resonant frequency point can be accurately acquired.

Furthermore, if the synchronous rectification switch is turned off prematurely in the control of the circuit, a phenomenon of −0.7 volts will occur in the drain-source voltage of the synchronous rectification switch, which will affect the efficiency. Therefore, by delaying the turning-off of the synchronous rectification switch, the synchronous rectification switch can be turned off at the appropriate timing to avoid the phenomenon of −0.7 volts in the drain-source voltage, and therefore it is beneficial to the efficiency performance of the converter. Specifically, when the primary-side harmonic resonant current is zero, it means that the synchronous rectification switch on the secondary side is in a zero-current cutoff state. Therefore, it is appropriate to control the turning off of the synchronous rectification switch in this state. Therefore, by reducing the DC voltage $V_{BULK}$ to make it operable at the first resonant frequency point and detecting the drain-source voltage waveform of the synchronous rectification switch, the maximum conduction width of the synchronous rectification switch can be truly calculated.

Furthermore, the present disclosure may also periodically update the maximum conduction width. By performing a one-time update of the maximum conduction width at fixed used intervals, the accuracy of the maximum conduction width can be ensured. That is, in the present disclosure, each resonant power supply will update its maximum conduction width periodically during use, in addition to determining it upon leaving the factory. In particular, the method adopted is to re-execute the steps (S10) to (S40) as previously mentioned, in order to update the maximum conduction width.

Figure 5A:
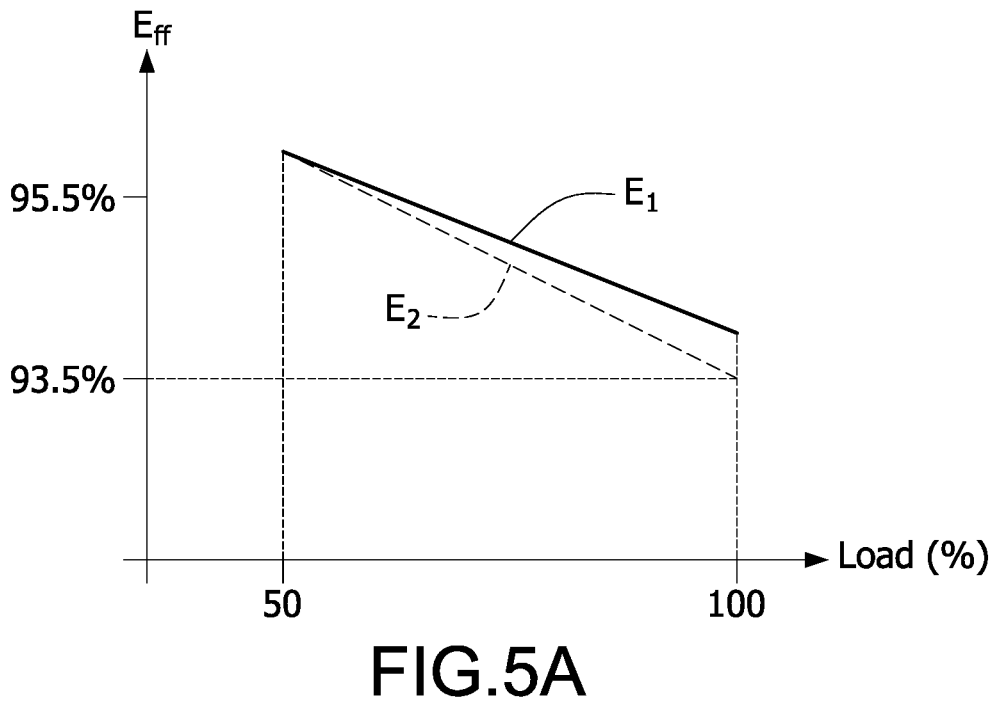
FIG. 5A is a schematic efficiency diagram of the synchronous rectification control under different loads according to the present disclosure.
Figure 5B:
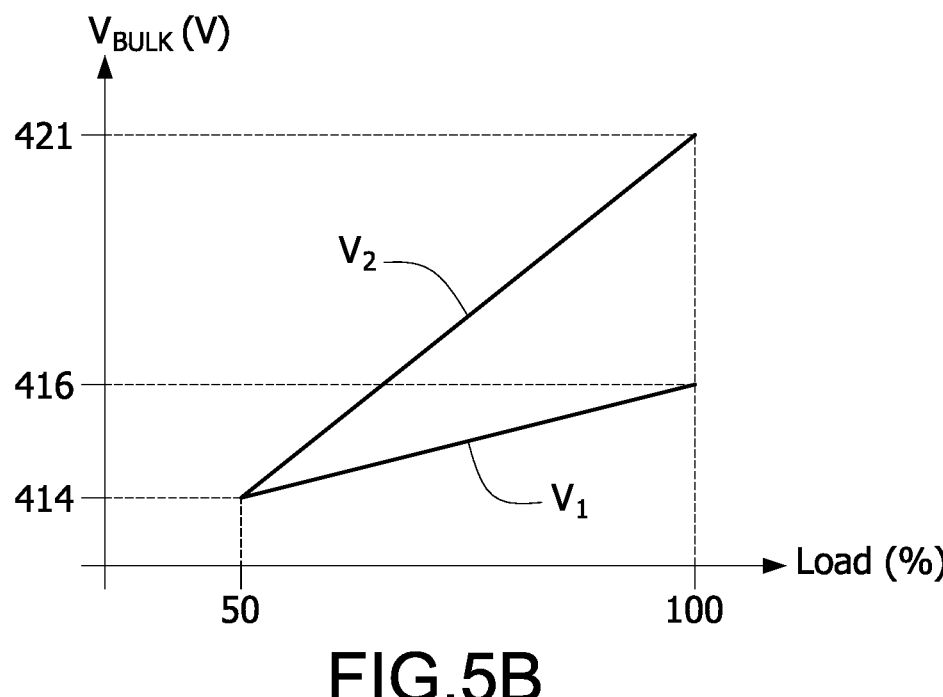
FIG. 5B is a schematic diagram of a DC voltage under different loads using the synchronous rectification control according to the present disclosure.

Please refer to FIG. 5A and FIG. 5B, which show a schematic efficiency diagram of the synchronous rectification control under different loads and a schematic diagram of a DC voltage under different loads using the synchronous rectification control according to the present disclosure, respectively. A second voltage curve V2 shown in FIG. 5B represents a non-decreased DC voltage $V_{BULK}$, and a first voltage curve V1 represents a decreased DC voltage $V_{BULK}$. By acquiring the entire period of the first resonant frequency point, the DC voltage $V_{BULK}$ can be automatically adjusted (decreased) to force the switching frequency closer to the first resonant frequency point, thereby achieving optimal efficiency. FIG. 5A illustrates the difference between a second efficiency curve E2 (corresponding to the second voltage curve V2 with the non-decreased DC voltage $V_{BULK}$) and a first efficiency curve E1 (corresponding to the first voltage curve V1 with the decreased DC voltage $V_{BULK}$) under a half-load condition to a full-load condition. Under the half-load condition, there is not much difference in efficiency between the two, but as the load increased, higher efficiency could be acquired by decreasing the DC voltage $V_{BULK}$.

In summary, by using an additional dual-ended detection circuit, the voltage waveform of the body diode can be safely detected, and it is possible to calculate the resonant parameter error of each power supply. Also, the resonant frequency is also written into the maximum width of the synchronous rectification control so that under normal operation, the conduction width with the SR can be automatically optimized to compensate for parameter variations of components in each power supply, thereby increasing the efficiency. Accordingly, compared to the traditional method of adjusting the body diode by single-ended detection of SR, the method disclosed in the present disclosure is safer and more efficient.

In summary, the present disclosure has the following features and advantages:

1. Due to the drain-source voltage detection of the synchronous rectification switch by the dual-ended detection circuit, the effects caused at high and low temperatures can be ignored by offsetting the temperature drift at two ends of the body diode.
2. According to the resonant frequency calculated based on the voltage waveform across two ends of the synchronous rectification switch, it can be used to adjust the optimal operation point of the converter.
3. By introducing dual-ended voltage detection with synchronous rectification switch and adjusting the resonant frequency accordingly, the DC voltage can be decreased to the operation point of the optimal resonant frequency.
4. Design the maximum conduction width for the ideal synchronous rectification switch to ensure the safe operation of the resonant converter and optimize efficiency.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A synchronous rectification control method for a resonant power supply, comprising steps of:

setting an initial condition width of a synchronous rectification switch, wherein the initial condition width is less than a maximum condition width, detecting a voltage waveform across two ends of a body diode of the synchronous rectification switch, calculating a resonant frequency according to the voltage waveform, and determining the maximum condition width of the synchronous rectification switch, wherein turning on the synchronous rectification switch at a first time, turning off the synchronous rectification switch at a second time, and turning on the synchronous rectification switch at a third time; calculating a first time difference between the second time and the first time, and calculating a second time difference between the third time and the second time; selecting the smaller of the first time difference and the second time difference as the maximum condition width.

2. The synchronous rectification control method as claimed in claim 1, wherein generating a first pulse voltage at the first time, generating a second pulse voltage at the second time, and generating a third pulse voltage at the third time; calculating the first time difference according to the first pulse voltage and the second pulse voltage, and calculating the second time difference according to the second pulse voltage and the third pulse voltage.

3. The synchronous rectification control method as claimed in claim 2, wherein the first time difference is less than the second time difference.

4. The synchronous rectification control method as claimed in claim 1, wherein the synchronous rectification switch is disposed on a secondary side of the resonant power supply, and the voltage waveform across two ends of the body diode is a voltage waveform between a drain and a source of the synchronous rectification switch.

5. The synchronous rectification control method as claimed in claim 4, wherein the resonant power supply comprises a dual comparator, and the dual comparator is configured to receive a voltage at the drain and a voltage at the source.

6. The synchronous rectification control method as claimed in claim 1, wherein acquiring a plurality of time differences, acquiring an average value of the plurality of time differences, and calculating the resonant frequency.

7. The synchronous rectification control method as claimed in claim 1, wherein delaying to turn off the synchronous rectification switch when the synchronous rectification switch operates at a zero-current condition.

8. The synchronous rectification control method as claimed in claim 1, wherein periodically updating the maximum condition width.

9. The synchronous rectification control method as claimed in claim 1, wherein controlling an input DC voltage of the resonant power supply to decrease so that the resonant power supply operates below a first resonant frequency point, and maintaining an output of the resonant power supply at a half-loading condition.

* * * * *